2,829,092
ELECTROLYTIC PROCESS FOR THE MANUFACTURE OF ALUMINUM ALLOYS

Jean Lucien Andrieux and Etienne Bonnier, Grenoble, France, assignors to Societe d'Electro-Chimie d'Electro-Metallurgie et des Acieries Electriques d'Ugine, Paris, France, a corporation of France No Drawing. Application February 26, 1952
Serial No. 273,567

Claims priority, application France March 6, 1951

8 Claims. (Cl. 204—60)

This invention relates to the manufacture of aluminum alloys, and more particularly to an electrolytic process for the manufacture of alloys mainly containing aluminum and calcium.

Aluminum-calcium alloys are generally prepared by simultaneous smelting of aluminum and calcium, both of these metals having been obtained previously by an electrolytic process.

It has also been proposed to produce aluminum-calcium alloys by reduction of lime by means of a molten aluminum bath.

All of these methods require the previous production of at least one of the metals concerned; aluminum in the case last mentioned.

With regard to aluminum, it is furthermore known that its manufacture presently requires the previous production of aluminum oxide. One of the alumina manufacturing processes (the Pedersen process), takes bauxite as the starting material. In a first step, bauxite, lime and iron oxide are smelted under reducing conditions. This results in a ferro-alloy and a slag constituted of calcium aluminate. By regulating the conditions of reduction, the whole of the bauxite impurities (iron, silicon and titanium) can be obtained in the ferro-alloy, thereby producing a pure calcium aluminate slag. However, a pure calcium aluminate slag is not usually desired since such product, because of its hardness, is not easily attacked completely by caustic soda lyes used in the second step of the process. Therefore, in the first step, the conditions of reduction are regulated so that the calcium aluminate slag contains from 5 to 10% silica in order to form slaking disilicate and silicoaluminates which makes easier the crushing which precedes the second step.

The calcium aluminate is crushed, and then in a second step, is leached with a solution of sodium carbonate, thereby producing a solution of sodium aluminate and muds containing calcium carbonate and silicates. The sodium aluminate solution after filtering is treated with carbon dioxide in a third step which precipitates hydrated alumina. After filtering, the so-purified hydrated alumina is calcined and may then be used for the electrolytic manufacture of aluminum.

According to the present invention, it is possible to obtain alloys mainly containing aluminum and an alkali metal, an alkaline earth metal, or a magnesium group metal while eliminating the second and third chemical steps of the above described alumina manufacturing process, and without the separate electrolytic production of aluminum or calcium.

Our process consists mainly in electrolyzing directly an alkali metal aluminate or a magnesium group metal aluminate or an earth metal aluminate or a mixture thereof dissolved in a molten bath of alkali metal halide or alkaline earth metal halide or magnesium group metal halide or a mixture thereof. By the term "alkali metals" as used herein, we mean to include sodium, potassium, lithium, rubidium and caesium. By the term "alkaline earth metals," we mean to include calcium, strontium and barium. By the term "magnesium group metals," we mean to include magnesium, glucinum, zinc, cadmium and mercury.

The composition of the electrolytic bath may vary according to the proportion in the starting aluminate of aluminum oxide and of the oxide of the alkali metal, alkaline earth metal, or magnesium group metal, and also according to the composition of the desired alloy. These baths are preferably formed of a molten mixture, which can be made of cryolite or of halides of aluminum and of the other metal, alone or in admixture, and which may furthermore contain such fluxes as alkali metal halides.

In the alloy deposited at the cathode, the relative proportions of aluminum and of the other metal are, of course, a function of the composition of the electrolytic bath. The composition of the bath depends upon the composition of the starting aluminate and upon its concentration in the bath.

By suitable selection of the constituents and their proportions in these baths, it is practically possible to obtain alloys, the aluminum content of which varies between 0 and 100%. This selection will be made according to the following rule. If an alloy having a high aluminum content is desired, a bath will be selected in which the proportion of aluminum to the other metal is relatively high, and vice versa. The aluminum content can be increased by increasing the content of aluminum salts in the bath, for instance by increasing the contents of cryolite, alumium chloride or aluminum fluoride. Conversely, if an alloy richer in calcium for instance is desired, the calcium content of the bath can be increased by increasing the amount of calcium chloride or calcium fluoride. It is also possible to regulate the composition and concentration of the starting aluminate in order to regulate the respective proportions in the bath of the aluminum and of the other metal. Other things being equal, if one employs an alumina-rich aluminate, the total alumina content in the bath will be increased and the proportion of aluminum electrodeposited from the bath will also be increased. By reducing or increasing the aluminate concentration in the bath, the concentration of both alumina and oxide of the second metal in the bath is reduced or increased and the ratio of the two metals which are electrodeposited is reduced or increased.

When it is desired to obtain an aluminum-calcium alloy, for instance, three main types of electrolytic baths will be used.

(1) To obtain alloys containing less than 5% of calcium, there is used a molten mixture made of calcium aluminate and cryolite, or a molten mixture of an aluminate dissolved in a ternary flux mixture comprising aluminum fluoride, sodium chloride and calcium fluoride in variable proportions.

(2) To obtain alloys containing from 5 to 82% of calcium, there is used a molten mixture of a ternary flux comprising mainly calcium chloride, calcium fluoride, and aluminum fluoride in variable proportions according to the composition of the alloy desired to be produced, and an aluminate in amount sufficient to saturate the bath.

(3) To obtain alloys containing from 82 to 100% calcium, there is used a molten mixture of a binary flux comprising a mixture of calcium chloride and calcium fluoride in variable proportions, and an aluminate in amount sufficient to saturate the bath.

To make possible an economical alloy production, it is desirable that the electrolytic operation achieve complete decomposition of the aluminate constituents, alloy on the one hand and oxygen on the other hand, exclusive of the decomposition of the other constituents present in the electrolytic bath. By selecting the baths, it is generally possible to accomplish this result for each aluminate, Not only is it possible to regulate the composition of the deposited alloy by suitably regulating the bath composition, as above indicated, but in most cases as will be shown by the examples given hereinafter, the electrolytic operation is indeed made at the expense of the aluminate only, so that it is possible at one and the same time to obtain an alloy having a ratio of aluminum to calcium or other metal which is identical to that of the aluminate, and to achieve this result without consuming elements other than those contained in the aluminate itself.

Without departing from the scope of the invention, one could effect operations in such manner that one of the aluminate elements is exhausted faster than the other. Thus when electrolyzing a calcium aluminate, an alloy could be deposited in which the ratio of aluminum to calcium is less than in the aluminate, making up as the operation progresses for the excess of deposited calcium by suitable lime additions to the electrolytic bath. Such an operation should be commercially advantageous, lime being a cheap raw material.

In some cases, and especially for obtaining alloys which are rich in one or the other of the metals, the flux itself may take a part in the metal production and make a contribution of one or more of the metals which constitute the alloy. The flux element thus consumed should then constantly be added to the bath so as to make up for its loss.

In all cases, whether electrolysis acts on aluminate only or upon aluminate and one or more of the elements of the flux, it is advisable, if a constant composition of the alloy is desired, to maintain the bath composition approximately constant during operation by appropriate additions to the bath.

In describing the invention thus far, we have referred mainly to the manufacture of aluminum-calcium alloys, but the invention applies also to any other alloys mainly containing aluminum and an alkali metal or an alkaline earth metal or a magnesium group metal or a mixture thereof, the above explained principles and methods remaining the same.

The type of electrolytic cell used depends on the desired alloy. At the usual working temperatures, the average density of the different types of electrolytic baths is approximately the same, namely about 2.25. The alloy is collected at the cathode, which may be located at the surface of the bath or on the hearth of the electrolytic cell. The cathode may be made of iron. Alloys containing from 0 to 70 or 75% of aluminum are easily obtained on the surface of the bath and moreover, by adding inactive dense salts such as barium chloride to the bath, this limit can be extended.

The following are non-restrictive examples of our process. In each of them, the ingredients of the bath are melted in a graphite crucible which is heated in a constant temperature furnace. The crucible may contain about 3 kgs. of electrolytic bath.

*Example I*

The composition of the starting aluminate was:

| | Percent |
|---|---|
| $Al_2O_3$ | 58.30 |
| CaO | 41.55 |
| $SiO_2$ | 0.15 |

This calcium aluminate approximately corresponds to the formula $3Al_2O_3 \cdot 4CaO$. It was actually a mixture of aluminates having the formulas $Al_2O_3 \cdot CaO$ and $3Al_2O_3 \cdot 5CaO$. Its melting point was about 1580° C. The flux employed was a ternary mixture containing 69.7% $CaCl_2$, 11.4% $CaF_2$, and 14.1% $AlF_3$. The mixture of calcium aluminate and flux was heated so as to melt the ingredients, the amount of calcium aluminate being sufficient to saturate the molten bath. The alloy corresponding to a complete exhaustion of the aluminate should contain 49.0% calcium and 51.0% aluminum. Consequently, in electrolyzing the bath the alloy was collected at the surface so that any excess aluminate which might settle to the bottom of the cell would not hinder the operation.

The bath having a temperature near 900° C. was electrolyzed for one hour, using a total intensity of 100 amperes, the corresponding cathode current density being 8 amperes per square centimeter, and a voltage of 9–10 volts. A large amount of an alloy containing 51.7% aluminum and 48.3% calcium and only traces of silicon was collected at the cathode.

*Example II*

This example illustrates the manufacture of an aluminum calcium alloy containing about 13% aluminum from the aluminate indicated in Example I.

The flux used in this example was a binary mixture containing 74% of calcium chloride and 26% of calcium fluoride. The amount of calcium aluminate used was sufficient to saturate the electrolytic bath. The molten bath at a temperature of 780 to 785° C. was electrolyzed for one hour using a total intensity of 100 amperes, the corresponding cathode current density being 8 amperes per square centimeter, using about 10 volts. A large amount of alloy containing 12.96% aluminum was collected at the cathode.

*Example III*

This example illustrates the preparation of an aluminum-magnesium alloy containing about 65% magnesium. The following bath composition was used:

| | Percent |
|---|---|
| Aluminate, $Al_2O_3 \cdot MgO$ | 16.5 |
| Eutectic mixture, $LiF-MgF_2$ | 83.5 |

The bath constituents were melted and then electrolyzed for two hours using a total intensity of about 10 amperes, the corresponding cathode current density being 1.2 amperes per square centimeter. A large amount of alloy globules containing 65.0% Mg and 35.0% Al and only traces of Li were obtained.

In place of the flux mentioned in Example III, we may employ as flux, aluminum or magnesium or lithium chlorides or fluorides or mixtures thereof. According to the bath composition, the electrolysis is carried out at a temperature between 800 and 1200° C.

It should be noted that according to any of the examples, the operating conditions are such that the heating effect due to the electrolysis current is sufficiently high to maintain the bath in the molten state. Consequently, as soon as the bath constituents are melted, the crucible containing the bath can be removed from the furnace or other heating device.

The process has been described as applied to the use of a bath containing calcium aluminate obtained by reduction of bauxites with lime. However, the process applies to most aluminates and particularly to commercial slags containing such aluminates, a large recovery of which is obtained by this process. Of course, when such slags are used, the alloy obtained may include elements other than aluminum and calcium, particularly iron and silicon coming from these slags.

The invention is not limited to the preferred embodiment, but may be otherwise embodied or practiced within the scope of the following claims.

We claim:

1. The process of making an alloy containing aluminum and calcium, which comprises electrolyzing directly calcium aluminate dissolved in a molten bath of halide of metal of the group consisting of alkali metals, alkaline earth metals and magnesium group metals.

2. The process of making an alloy containing aluminum and calcium, which comprises electrolyzing directly calcium aluminate dissolved in a molten bath containing a mixture of calcium chloride, calcium fluoride, and aluminum fluoride.

3. The process of making an alloy containing aluminum and calcium which comprises electrolyzing directly calcium aluminate dissolved in a molten bath containing a mixture of calcium chloride and calcium fluoride.

4. The process of making an alloy containing aluminum and magnesium, which comprises electrolyzing directly magnesium aluminate dissolved in a molten bath of halide of metal of the group consisting of alkali metals, alkaline earth metals and earth metals.

5. The process of making an alloy containing aluminum and magnesium, which comprises electrolyzing directly magnesium aluminate dissolved in a molten bath containing a mixture of lithium fluoride and magnesium fluoride.

6. The process according to claim 1, wherein the electrolysis is carried out at a voltage and current intensity such that the aluminate is decomposed and oxygen is liberated at the anode without substantial decomposition of the halide and without substantial liberation of halogen at the anode.

7. The process according to claim 2, wherein the electrolysis is carried out at a voltage and current intensity such that the aluminate is decomposed and oxygen is liberated at the anode without substantial decomposition of the halide and without substantial liberation of halogen at the anode.

8. The process according to claim 3, wherein the electrolysis is carried out at a voltage and current intensity such that the aluminate is decomposed and oxygen is liberated at the anode without substantial decomposition of the halide and without substantial liberation of halogen at the anode.

References Cited in the file of this patent

UNITED STATES PATENTS

| | | |
|---|---|---|
| 786,185 | Blackmore | Mar. 28, 1905 |
| 1,919,379 | Pfau | July 25, 1933 |
| 2,302,604 | Dolbear | Nov. 17, 1942 |
| 2,398,591 | Mitchell | Apr. 16, 1946 |

OTHER REFERENCES

"Hackh's Chemical Dictionary," second edition (1937), page 326. Copy in Scientific Library.

U. S. DEPARTMENT OF COMMERCE
PATENT OFFICE

CERTIFICATE OF CORRECTION

Patent No. 2,829,092                                        April 1, 1958

Jean Lucien Andrieux et al.

It is hereby certified that error appears in the printed specification of the above numbered patent requiring correction and that the said Letters Patent should read as corrected below.

Column 1, line 66, after "or" insert -- an alkaline earth metal aluminate or --; line 67, after "or", first occurrence, strike out "an earth metal aluminate or".

Signed and sealed this 20th day of May 1958.

(SEAL)
Attest:

KARL H. AXLINE                                           ROBERT C. WATSON
Attesting Officer                                      Commissioner of Patents